United States Patent
Joshi et al.

(10) Patent No.: US 7,912,831 B2
(45) Date of Patent: Mar. 22, 2011

(54) SYSTEM AND METHOD FOR CHARACTERIZING A WEB PAGE USING MULTIPLE ANCHOR SETS OF WEB PAGES

(75) Inventors: Amruta Sadanand Joshi, Palo Alto, CA (US); Shanmugasundaram Ravikumar, Cupertino, CA (US); Benjamin Clay Reed, Morgan Hill, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 11/542,079

(22) Filed: Oct. 3, 2006

(65) Prior Publication Data

US 2008/0082481 A1 Apr. 3, 2008

(51) Int. Cl.
*G06F 17/00* (2006.01)
(52) U.S. Cl. ........................................................ 707/709
(58) Field of Classification Search .................... 707/709
See application file for complete search history.

(56) References Cited

U.S. PATENT DOCUMENTS

| | | | | |
|---|---|---|---|---|
| 5,895,470 | A * | 4/1999 | Pirolli et al. | 707/102 |
| 6,112,202 | A * | 8/2000 | Kleinberg | 707/5 |
| 6,285,999 | B1 * | 9/2001 | Page | 707/5 |
| 6,349,296 | B1 * | 2/2002 | Broder et al. | 707/3 |
| 6,363,379 | B1 * | 3/2002 | Jacobson et al. | 707/5 |
| 6,654,743 | B1 * | 11/2003 | Hogg et al. | 707/7 |
| 6,847,992 | B1 * | 1/2005 | Haitsuka et al. | 709/218 |
| 6,990,628 | B1 * | 1/2006 | Palmer et al. | 715/234 |
| 7,028,029 | B2 * | 4/2006 | Kamvar et al. | 707/5 |
| 7,308,643 | B1 * | 12/2007 | Zhu et al. | 715/733 |
| 2002/0059219 | A1 * | 5/2002 | Neveitt | 707/5 |
| 2003/0177118 | A1 * | 9/2003 | Moon et al. | 707/5 |
| 2003/0208482 | A1 * | 11/2003 | Kim et al. | 707/3 |
| 2003/0221166 | A1 * | 11/2003 | Farahat et al. | 715/513 |
| 2004/0193698 | A1 * | 9/2004 | Lakshminarayana | 709/218 |
| 2005/0086260 | A1 * | 4/2005 | Canright et al. | 707/104.1 |
| 2005/0171946 | A1 * | 8/2005 | Maim | 707/5 |
| 2006/0095281 | A1 * | 5/2006 | Chickering et al. | 705/1 |
| 2006/0195439 | A1 * | 8/2006 | Selberg | 707/5 |
| 2006/0282455 | A1 * | 12/2006 | Lee et al. | 707/102 |
| 2007/0073579 | A1 * | 3/2007 | Immorlica et al. | 705/14 |
| 2007/0143322 | A1 * | 6/2007 | Kothari et al. | 707/101 |
| 2007/0185871 | A1 * | 8/2007 | Canright et al. | 707/7 |
| 2008/0010281 | A1 * | 1/2008 | Berkhin et al. | 707/7 |
| 2008/0010292 | A1 * | 1/2008 | Poola | 707/10 |
| 2008/0052263 | A1 * | 2/2008 | Andersen et al. | 707/1 |
| 2009/0240677 | A1 * | 9/2009 | Parekh et al. | 707/5 |

OTHER PUBLICATIONS

T. H. Haveliwala, Topic-sensitive PageRank, May 2002, in Proceedings of the Eleventh International World Wide Web Conference, Honolulu, Hawaii.* J. M. Kleinberg, Authoritative Sources in a Hyperlinked Environment, 1999, Journal of the ACM, 46(5):604-632.*
TheGypsy, Yahoo follows up Personalized PageRank with HarmonyRank, Apr. 3, 2008 , http://www.huomah.com/Search-Engines/Algorithm-Matters/Yahoo-follows-up-Personalized-PageRank-with-HarmonyRank.html.*

* cited by examiner

*Primary Examiner* — Charles Rones
*Assistant Examiner* — Kurt Mueller

(57) ABSTRACT

A system and method are provided to accessing a set of web pages within a context. The set of web pages may be represented using a graph comprising a set of nodes and a set of edges. First and second probability distributions may be generated over a set of nodes of the graph using a first algorithm to indicate a measure of closeness among the set of web pages. A characterization may be determined with respect to context for a web page from a second subset of web pages based on the first and second probability distributions. An indication of the characterization of the web page from the second subset of web pages may be outputted.

18 Claims, 7 Drawing Sheets

SYSTEM AND METHOD FOR CHARACTERIZING A WEB PAGE USING MULTIPLE ANCHOR SETS OF WEB PAGES

FIELD OF THE INVENTION

The invention relates generally to computer systems, and more particularly to an improved system and method for characterizing a web page using multiple anchor sets of web pages.

BACKGROUND OF THE INVENTION

Expanding a seed set of web pages into a larger group of web pages is a common procedure performed in link-based analysis of websites. Although the seed expansion problem has been addressed by numerous researchers as an intermediate step of various graph-analytic analyses on the web, unfortunately existing techniques fail to provide any measure of the character of a web page or the character of the expanded group of web pages. For instance, the HITS algorithm, well-known in the field, used a search engine to generate a seed set, and then performed a fixed-depth neighborhood expansion in order to generate a larger set of pages upon which the HITS algorithm was employed. The general technique of the HITS algorithm has seen broad adoption, and is now a common technique for local link-based analysis. Variants of this technique have been employed in community finding, in finding similar pages, in pagerank, in trustrank, and in classification of web pages. More sophisticated expansions have been applied in the context of community discovery.

However, without any way to measure the character of a web page that may be included by expansion of the seed set into a group of web pages, it may be difficult to automatically understand the character of the group of web pages resulting from the expansion of the seed set. In the absence of such context, meaningful characterizations of groups of web pages may continue to elude automatic discovery. What is needed is a way to characterize the relationship of a web page to a group of web pages and to measure the strength of the characterization. Such a system and method should be able to provide a context for understanding the meaning of such a measure characterizing the web page.

SUMMARY OF THE INVENTION

Briefly, the present invention may provide a system and method for characterizing a web page using multiple anchor sets of web pages. In an embodiment, a characterization engine may be provided for characterizing a web page. The characterization engine may include an operably coupled probability distribution engine for generating a probability distribution over the vertices of a graph representing a collection of web pages. The characterization engine may also include an operably coupled characterization measure analyzer for determining a quality measure for the web page using the probability distribution.

The present invention may characterize web pages in a collection of unknown web pages using known anchor sets of web pages that may be linked to the collection of unknown web pages. In various embodiments, there may be an anchor set with a positive characterization and an anchor set with a negative characterization. A direction and method may be selected for propagating a probability distribution between vertices of a graph representing the collection of web pages and vertices of the anchor sets representing the anchor sets of web pages. Methods for propagating the probability distribution in a forward, backward or bidirectional direction are provided. Various quality measures of the characterization of the vertices are provided using the propagated probability distribution. These various quality measures may be paired and combined in different ways to provide a characterization of the vertices representing the unknown web pages.

Many applications may use the present invention including applications for detecting spam web pages, pornographic web pages, and other undesired web pages. The techniques of the present invention are quite general and will also apply for other definitions of anchor sets with a positive or negative characterization. For example, applications may use the present invention for the detection of high-caliber blogs and other collections of web pages with a positive characterization. Additionally, a search application may find similar web pages using anchor sets of web pages or a clustering application may find local segments of web pages using anchor set of web pages. For any of these applications, the present invention may advantageously provide a characterization of a web page that may be linked to a known anchor set of web pages. Other advantages will become apparent from the following detailed description when taken in conjunction with the drawings, in which:

DETAILED DESCRIPTION

Exemplary Operating Environment

Figure 1:
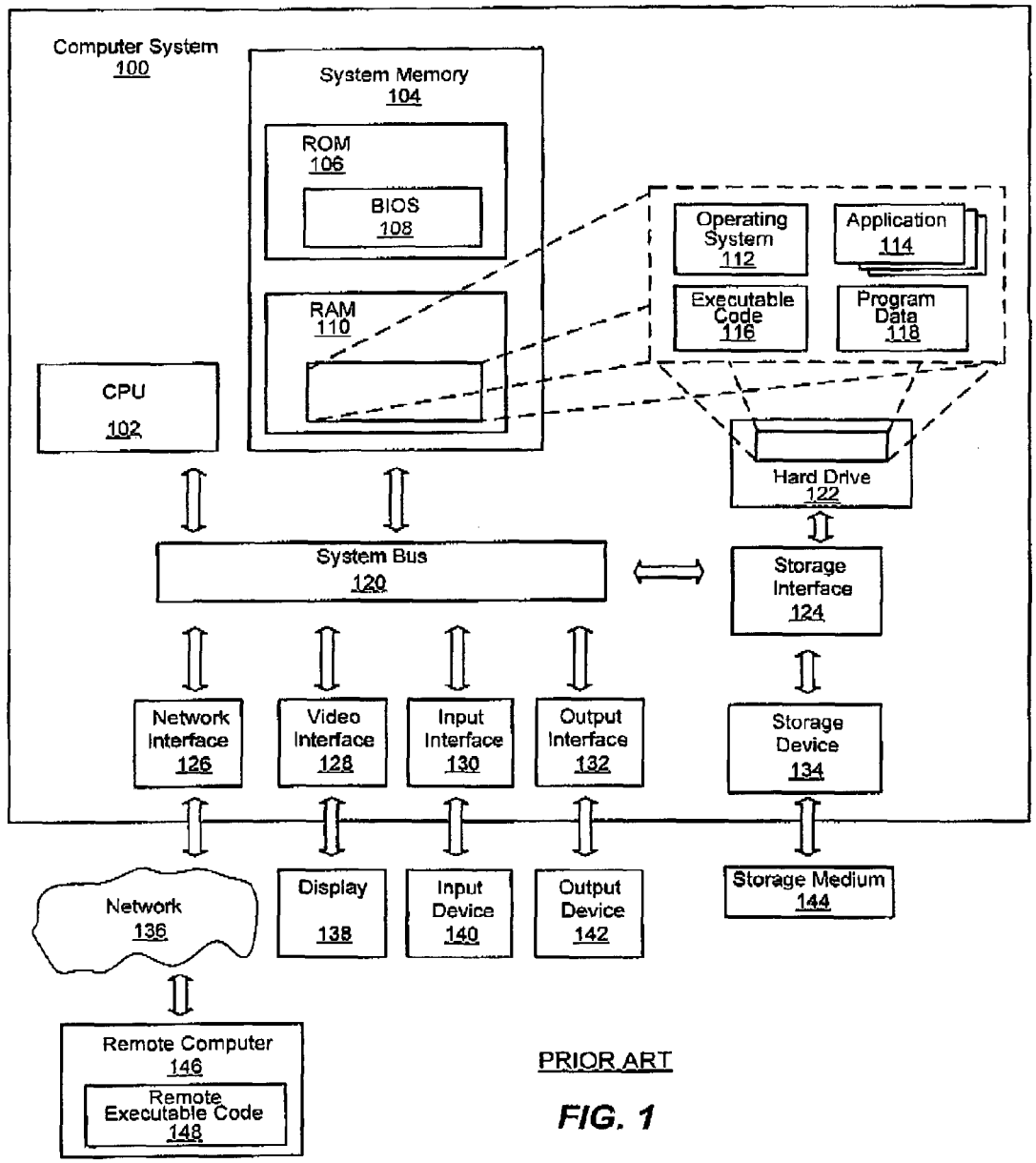
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, non-volatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Characterizing a Web Page Using Multiple Anchor Sets

The present invention is generally directed towards a system and method for characterizing a web page using multiple anchor sets of web pages. An anchor or anchor set as used herein may mean a collection of web pages with a known characterization. Multiple anchor sets with different characterizations that may be linked to a collection of unknown web pages may be used to characterize those unknown web pages.

A probability distribution may be propagated between vertices of a graph representing the collection of web pages and the vertices of the anchor sets representing the anchor sets of web pages. Various quality measures of the characterization of the vertices may then be provided using the propagated probability distribution. These various quality measures may be paired and combined in different ways to provide a characterization of the unknown web pages.

As will be seen, providing such a characterization of a web page or web site given anchor sets of web pages may be applied broadly by many different applications, including applications for detecting spam or pornographic web pages. As will be understood, the various block diagrams, flow charts and scenarios described herein are only examples, and there are many other scenarios to which the present invention will apply.

Figure 2:
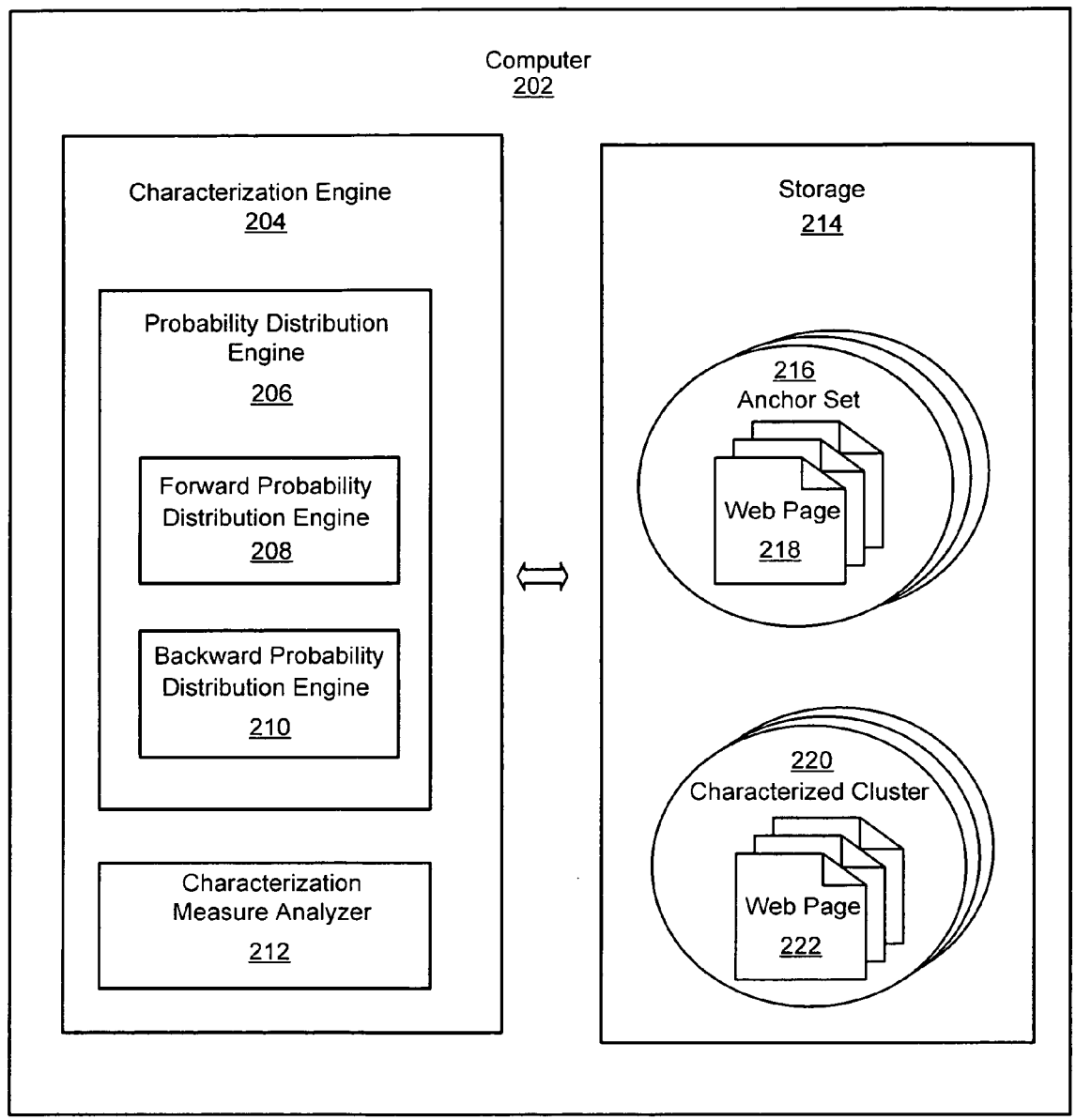
FIG. 2 is a block diagram generally representing an exemplary architecture of system components in an embodiment for characterizing a web page using multiple anchor sets of web pages, in accordance with an aspect of the present invention.

Turning to FIG. 2 of the drawings, there is shown a block diagram generally representing an exemplary architecture of system components for characterizing a web page using multiple anchor sets of web pages. Those skilled in the art will appreciate that the functionality implemented within the blocks illustrated in the diagram may be implemented as separate components or the functionality of several or all of the blocks may be implemented within a single component. For example, the functionality for the characterization measure analyzer 212 may be included in the same component as the probability distribution engine 206. Or the functionality of the characterization measure analyzer 212 may be implemented as a separate component from the characterization engine 204.

In various embodiments, a computer 202, such as computer system 100 of FIG. 1, may include a characterization engine 204 operably coupled to storage 214. In general, the characterization engine 204 may be any type of executable software code such as a kernel component, an application program, a linked library, an object with methods, and so forth. The storage 214 may be any type of computer-readable media and may store anchor set 216 of web pages 218, or links to web pages such as URLs, and characterized clusters 220 of web pages 222, or links to web pages such as URLs.

The characterization engine 204 may provide services for using anchor sets 216 of web pages 218 to characterize web pages 222 that may be grouped into characterized clusters 220. A web page may be any information that may be addressable by a URL, including a document, an image, audio, and so forth. The characterization engine 204 may include a probability distribution engine 206 for generating a probability distribution over the vertices of a graph representing a collection of web pages, and a characterization measure analyzer 212 for determining quality measures using the probability distribution to characterize web pages. The probability distribution engine 206 may include a forward probability distribution engine 208 for generating a probability distribution in a forward direction over the vertices of a graph, and a backward probability distribution engine 210 for generating a probability distribution in a backward direction over the vertices of a graph. Each of these modules may also be any type of executable software code such as a kernel component, an application program, a linked library, an object with methods, or other type of executable software code.

There are many applications which may use the present invention for characterizing a web page using multiple anchor sets of web pages. For example, applications that may perform link-based analysis of a graph representing a collection of web pages may use the present invention for the detection of spam pages. A clean set of good pages A and a set of spam pages B may, for instance, be manually identified, and these anchor sets may be used by the present invention to determine a score for remaining page in the collection of web pages. The score may be used to indicate the extent to which the page may be considered good versus spam. The techniques of the present invention are quite general, and will also apply for other definitions of anchor sets with a positive or negative characterization. For example, applications may use the present invention for the detection of pornographic web pages, high-caliber blogs, and other collections of web pages with positive or negative characterizations. Additionally, a search application may find similar web pages using anchor sets of web pages; a clustering application may find local segments of web pages using anchor set of web pages; a web page classifier may identify web pages that may belong to a class of web pages using anchor sets of web pages, and so forth.

Figure 3:
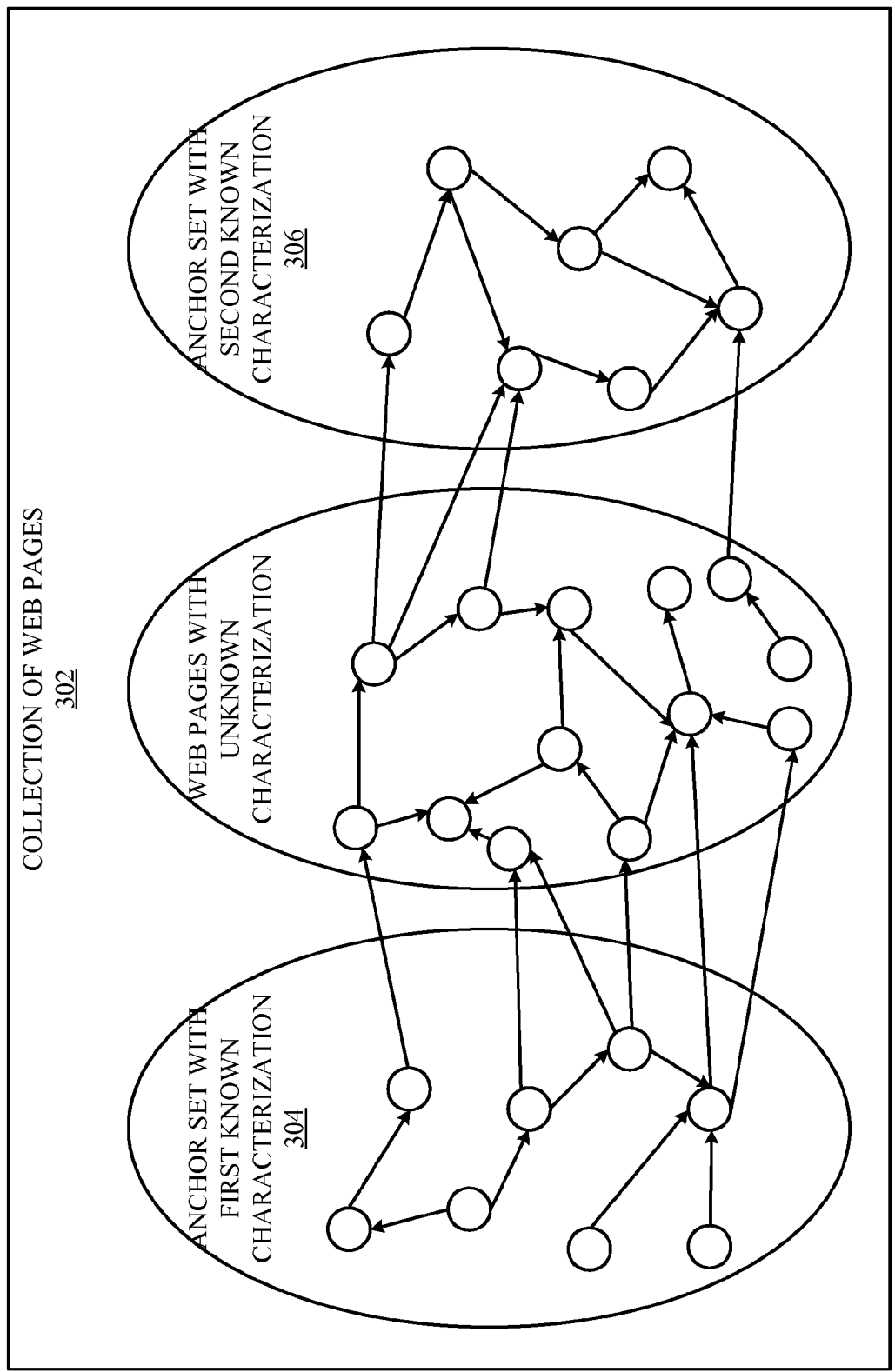
FIG. 3 is an illustration depicting in an embodiment an anchor set of web pages with a positive characterization and an anchor set of web pages with a negative characterization interconnected by hyperlinks within a collection of web pages, in accordance with an aspect of the present invention.

FIG. 3 presents an illustration depicting in an embodiment an anchor set of web pages with a positive characterization and an anchor set of web pages with a negative characterization interconnected by hyperlinks within a collection of web pages. The anchor set of web pages with a positive characterization 304 may be a subset of web pages within the collection of web pages 302 that may represent known good web pages. For instance, these web pages may be known web pages of high quality such as known web pages of high-caliber blogs, news sites, web magazines, and so forth. And the anchor set of web pages with a negative characteristic 306 may be a subset of web pages within the collection of web pages 302 that may represent known bad web pages. These web pages may be known web pages of low quality such as known web pages of spam sites, low-caliber blogs, pornography sites, and so forth. In general, a web site with web pages of high quality will not typically choose to link to web pages of low quality. Therefore, web sites and web pages with links from high quality web pages or web sites will be more likely to be high quality, and web site and web pages with links from low quality web pages or web sites will be more likely to be low quality.

Although FIG. 3 may present an illustration depicting an embodiment with two anchor sets, those skilled in the art will appreciate that any number of anchor sets may be used to characterize a web page. In general, multiple anchor sets with different characterizations that may be linked to a collection of unknown web pages may be used to characterize those unknown web pages. In various embodiments for instance, there may be one or more anchor sets with a positive characterization and one or more anchor sets with a negative characterization.

Figure 4:
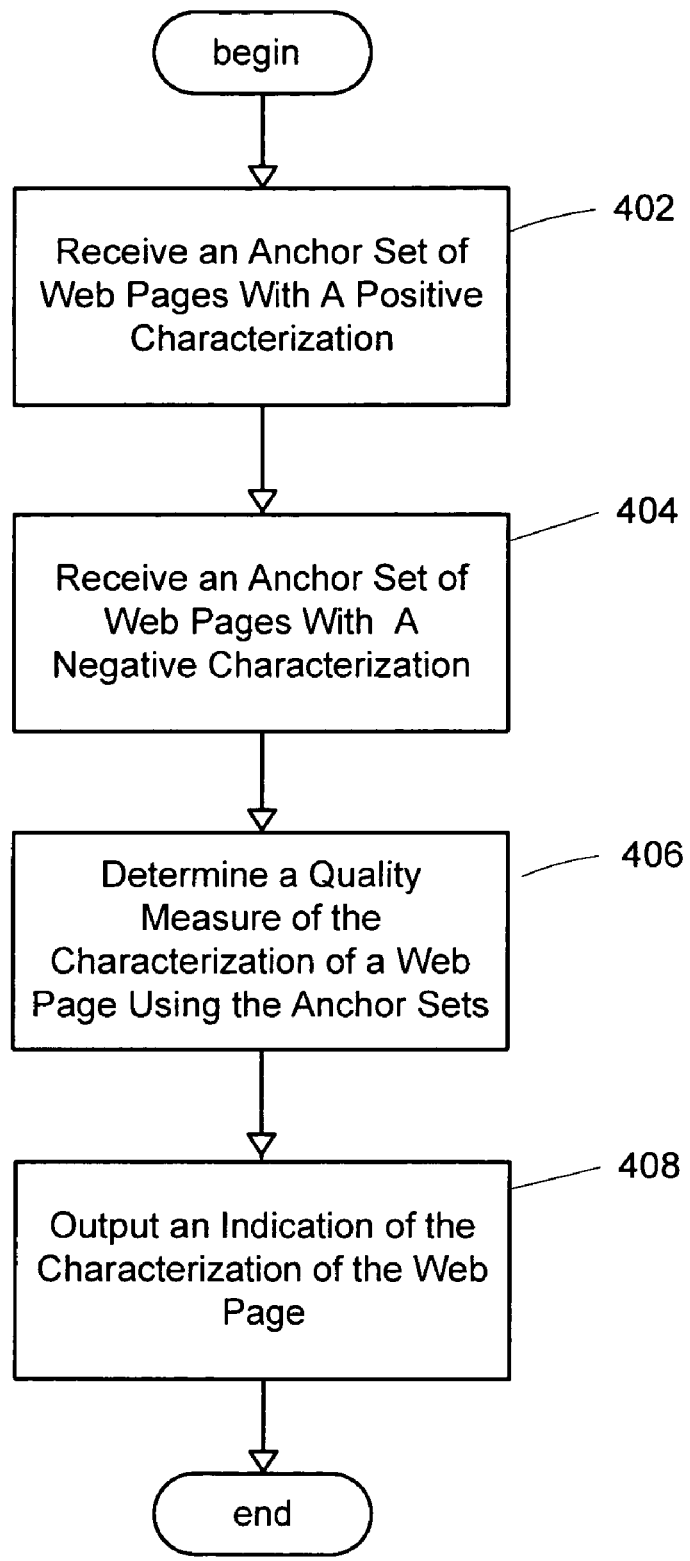
FIG. 4 is a flowchart generally representing the steps undertaken in one embodiment for characterizing a web page using multiple anchor sets of web pages, in accordance with an aspect of the present invention.

FIG. 4 presents a flowchart generally representing the steps undertaken in one embodiment for characterizing a web page using multiple anchor sets of web pages. An anchor set of web pages with a positive characterization that may have links to a collection of web pages may be received at step 402. An anchor set of web pages with a negative characterization that may also have links to the collection of web pages may be received at step 404. The collection of web pages may be represented in an embodiment as vertices of a graph and each anchor set of web pages may be represented as a subset of the vertices of the graph. Each characterized anchor set of web pages may be provided by an application or other source, and may represent web pages from different websites.

At step 406, a quality measure of the characterization of one or more web pages may be determined using the different anchor sets. For instance, a positive characterization measure and a negative characterization measure may be calculated. In various embodiments, the measures may be based on different types of graph propagations using each of the different anchor sets. The variety of measures may be paired and combined to provide an overall web page quality measure in several different ways. A positive characterization measure and/or a negative characterization measure may be scaled or weighted in order to be combined. At step 408, an indication of the characterization of the one or more web pages may be output. In various embodiments, the indication may be an overall web page quality measure that may be used to characterize a web page.

Figure 5:
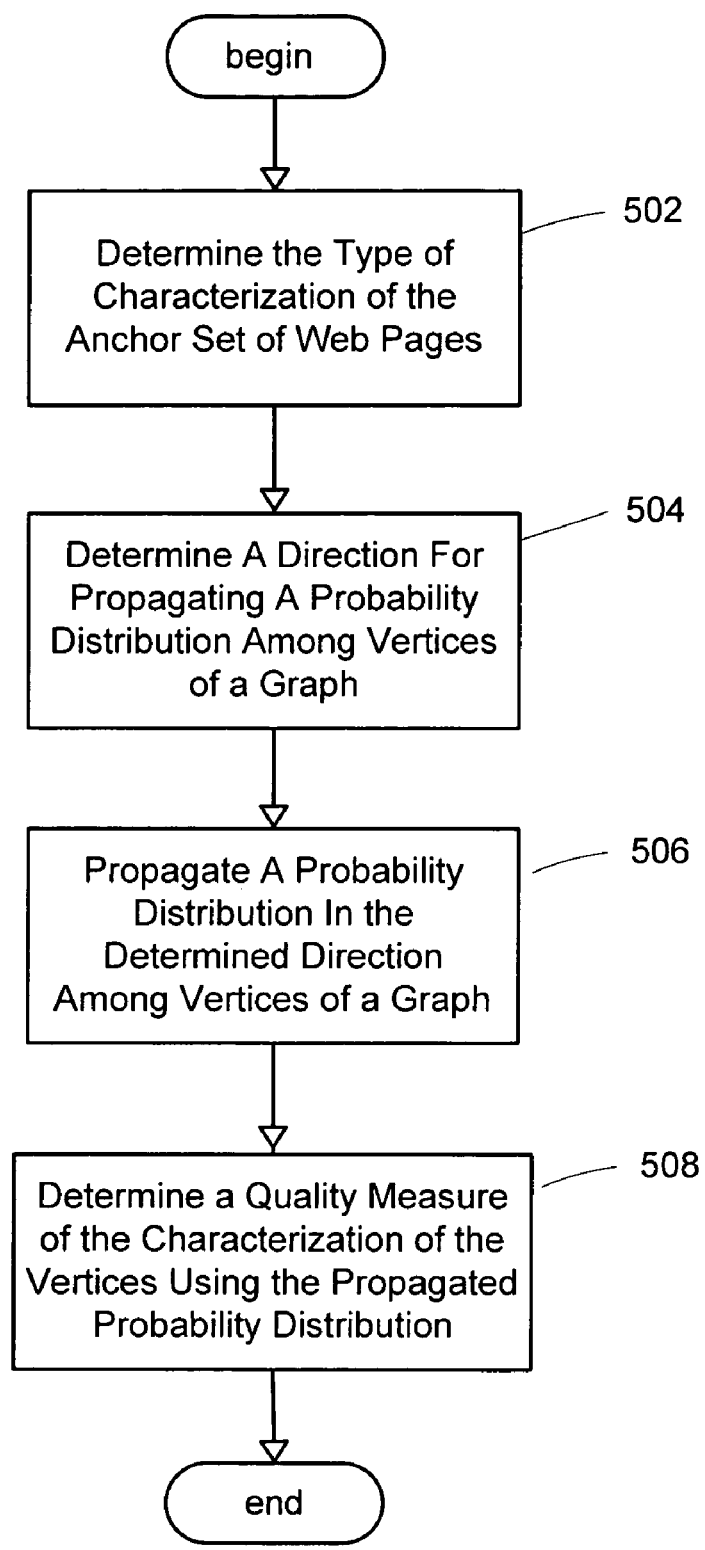
FIG. 5 is a flowchart generally representing the steps undertaken in one embodiment for characterizing a web page using an anchor set of web pages, in accordance with an aspect of the present invention.

FIG. 5 presents a flowchart generally representing the steps undertaken in one embodiment for characterizing a web page using an anchor set of web pages. At step 502, the type of characterization may be determined for the anchor set of web pages. For example, the type of characterization may be either positive or negative. In an embodiment, the type of characterization may be indicated in metadata describing the anchor set of web pages. After determining the type of characterization of the anchor set of web pages, the direction for propagating a probability distribution among vertices of the graph may be determined at step 504. In general, a web page quality measure that may be used to characterize a web page may capture the similarity between an unknown vertex u and an anchor set A, which may be characterized as either positive or negative. In any case, the measure may operate by beginning at a specific location within the graph and then propagating a score through the graph according to specific rules. In an embodiment, the propagation rule may apply the Personalized PageRank method of Haveliwala et al. (PPR) starting at the anchor set A and going to a vertex u. (See T. H. Haveliwala, *Topic-sensitive PageRank*, In Proceedings of the Eleventh International World Wide Web Conference, Honolulu, Hi., May 2002). In another embodiment, the propagation rule may apply the Harmonic Rank (HR) method starting at a vertex u and going to an anchor set A.

At step 506, a probability distribution may be propagated in the determined direction among vertices of the graph. If the direction may be determined to go from the anchor set of vertices to vertices of the graph, then PPR may be used. Consider for example that the anchor set may be A with a positive characterization and PPR may be the method used to propagate a probability distribution from the vertices of A to reachable vertices u of the graph. Such a propagation method may be viewed as a web surfer beginning at anchor set A and walking forward through the graph at random. At each step forward through the graph, the surfer may stop and flip an α-biased coin in this analogy. If the coin may come up tails, the surfer may begin again at a random entry of anchor set A; otherwise, the surfer may continue the walk to a reachable vertex. Thus, the quality of a page may represent its overall likelihood of being visited by the surfer in this model. Recalling that in this example the anchor set A may be the set with a positive characterization, the quality of vertex u may correspond to the "reachability" of a web page represented by u from the known set of high-quality pages, and such a method may accordingly provide a reasonable approach to quantifying the quality of the web page represented by u.

If, on the other hand, the direction may be determined to go from a vertex u to an anchor set A, then the HR method may be used. Again, consider that the anchor set may be A with a positive characterization and the HR method may be used to propagate a probability distribution from the vertices u of the graph to reachable vertices of A. Rather than walking from A towards u, consider the analogy of a web surfer walking from u backwards towards A. Such an analogy may be viewed as a random walker beginning at u and walking backwards on the graph trying to reach A. At each vertex along the way, the surfer may flip a coin and either continue, or abort the walk in a failed state. If the surfer ever reaches A, the walk may end in state of success. The measure of the quality of u may be the probability that the walk terminates in success.

Notice that the anchor set A had a positive characterization in the examples provided above of propagating a probability distribution in the graph in a particular direction. If the anchor set A may have a negative characterization, then the two methods of propagation may require a change. Namely, a probability for an anchor set with a positive characterization may propagate forward, and a probability for an anchor set with a negative characterization may be propagated backwards. So if the PPR method may be used to propagate a probability from the vertices of an anchor set A with a negative characterization to reachable vertices u of the graph, the walk from A may proceed backwards. And the walk from u may proceed forwards to A if the HR method may be used to propagate a probability from a vertex u of the graph to reachable vertices of an anchor set A with a negative characterization.

At step 508, a quality measure of the characterization of the unknown vertices reachable by the anchor sets may then be determined using the propagated probability distribution. In an embodiment, this may result in four measures, based on the combinations of the different types of anchor sets, either with a positive characterization or with a negative characterization, and the type of propagation method used, either the PPR method or the HR method. Each of the four measures described above may be interpreted as a model for the behavior of a random surfer. However, there are also propagation models for which this may not be the case. For example, the well-known HITS propagation of Kleinberg (see J. M. Kleinberg, *Authoritative Sources in a Hyperlinked Environment*, Journal of the ACM, 46(5):604-632, 1999) may not preserve flow, which in other words may be similar to saying that the principal eigenvalue of the propagation matrix may not be constrained to be 1. Such models like the HITS propagation that may not preserve flow may not be construed as capturing the behavior of a random surfer.

In particular, a flow-conserving forward walk may propagate a fraction of the probability of a vertex to its reachable vertices. For example, if a certain page may be known to be of high quality, and it may link to ten other pages, each of those other pages may inherit one tenth or less of the probability of high quality assigned to the original page. Methods which may not conserve flow may pass along a down-weighted probability of high quality to every destination, even if there are many of them. Typically, the probability of high quality may be down-weighted at each step, so that longer and longer paths may pass along less and less probability of high quality. The same may also holds for propagating a probability of low quality where flow may not be conserved from a web page known to be of low quality. Each of the four measures described above may be modified to a non-flow-conserving variant, resulting in a total of eight measures.

More particularly, consider G=(V, E) to be a directed graph with |V|=n and M to be a matrix representing G where $m_{u,v}=1$ if there may be an edge from vertex u of V to vertex v of V, and 0 otherwise. Also consider $od_u$ to represent the out-degree of vertex u such that $$od_u = \sum_{v=1}^{n} m_{u,v}.$$

Likewise, consider $id_u$ to represent the in-degree of vertex u such that $$id_u = \sum_{v=1}^{n} m_{v,u}.$$

Furthermore, consider out(u) to denote the out-neighbors of u. A matrix $R=[r_{u,v}]$ may denote a row-normalized version of M such that $r_{v,v}=m_{u,v}/od_u$. Similarly, a matrix $C=[c_{u,v}]$ may denote a column-normalized version of M such that $c_{u,v}=m_{u,v}/id_v$. A Markov process may then be defined for walking forward on the edges of the graph by a one-step update rule of R, namely $p \leftarrow R^T \cdot p$, for any probability distribution p over the n vertices. Another Markov process may also be defined on the graph for walking backward on the edges of the graph by a one-step update rule of C, namely $p \leftarrow C \cdot p$, for any probability distribution p over the n vertices. The matrix C may be represent the transpose of the row-normalized form of $M^T$.

An anchor set S may be defined to be a subset of vertices in the graph such that $S \subset V$. There may be several embodiments for defining the proximity of a given vertex u to an anchor set S in which a real-valued score, $\pi(S;u) \in [0,1]$, may be computed for every vertex $u \in V\backslash S; \pi(S;u)=1$ for $u \in S$. In an embodiment, the connectivity of u to S may be used to define the proximity of u to S. The forward connectivity of u to S may be defined to be $\pi(S,f;u)$ and the backward connectivity of S to u may be defined to be $\pi(S,b;u)$. As used herein, a forward direction of u to S means a direction following the forward connectivity of u to S, and a backward direction of u to S means a direction following the backward connectivity of S to u. Similarly, a forward direction of S to u means a direction following the forward connectivity of S to u, and a backward direction of S to u means a direction following the backward connectivity of u to S. In various embodiments, the PPR method and the HR method may be used to compute a proximity score of u to S.

Figure 6:
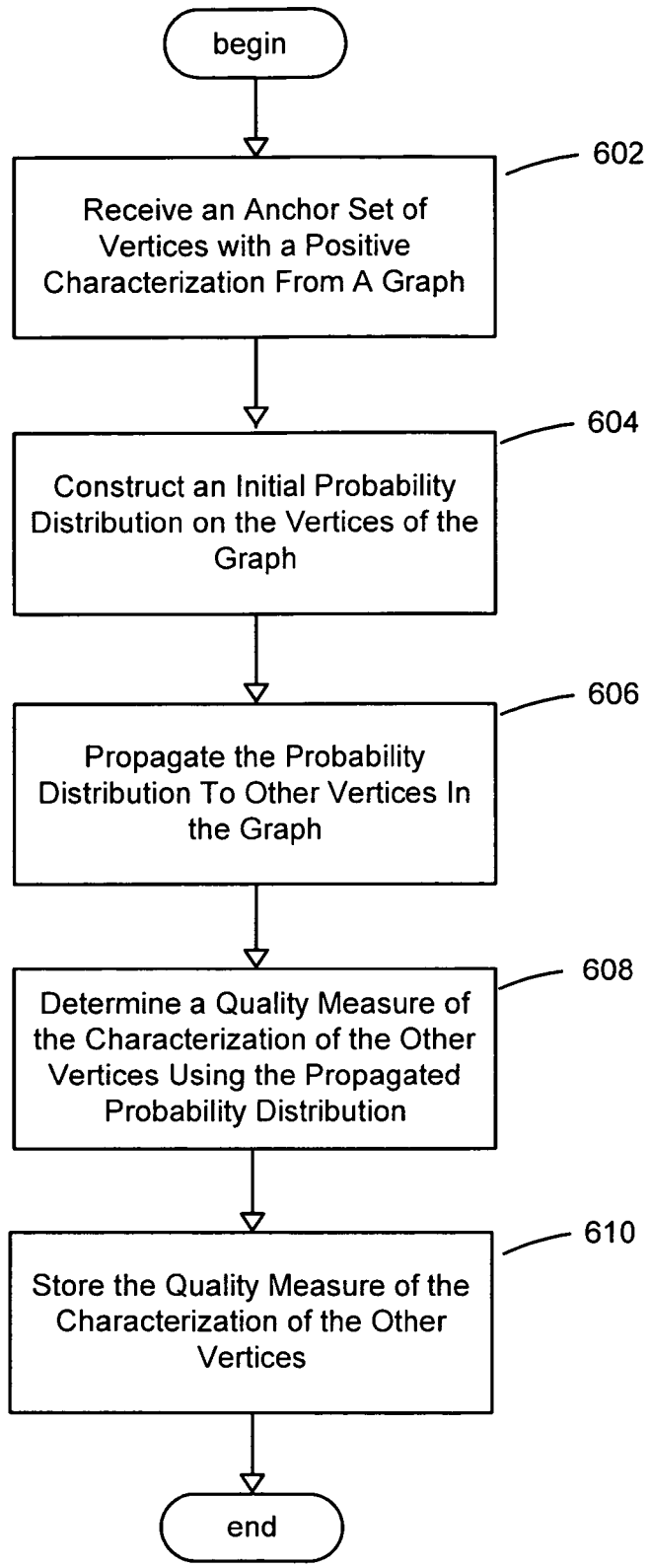
FIG. 6 is a flowchart generally representing the steps undertaken in one embodiment for characterizing a web page using an anchor set with a positive characterization, in accordance with an aspect of the present invention.

FIG. 6 presents a flowchart generally representing the steps undertaken in one embodiment for characterizing a web page using an anchor set with a positive characterization. At step 602, an anchor set of vertices in a graph may be received that may have a positive characterization. An initial probability distribution may be constructed at step 604 on the vertices of the anchor set. The probability distribution may be propagated to other vertices in the graph at step 606.

In an embodiment using the PPR method to propagate the initial probability distribution forward from S, S may specify a personalization vector. A Markov chain may be produced by a random walk on the vertices of the graph G. If the probability assigned to a vertex u may be $\alpha=0.15$ at a step of the walk, the walk may jump to a uniformly chosen vertex in S. If the probability assigned to a vertex u may be $1-\alpha=0.85$ at a step of the walk, the walk may proceed to a neighbor of u chosen uniformly at random. And if there may be no neighbors of u, then the walk may jump to a uniformly chosen vertex in V. The proximity of u to S may then be given by the stationary probability value of the Markov chain. Thus, a column vector defined by $\pi(S,f,pr)=(1-\alpha)\cdot R^T \cdot \pi(S,f,pr)+(\alpha/|S|)\cdot \vec{S}$, may represent the proximity score of u to S, where $\vec{S}$ may be the characteristic vector of S.

In another embodiment, the HR method may be used to propagate the initial probability distribution backward from other vertices of the graph to the anchor set of vertices at step 606. The matrix R may be modified by creating two absorbing states. One absorbing state may be defined to be s, corresponding to the anchor S. The other absorbing state may be defined to be r, corresponding to a restart of the random walk. Additionally, an edge may be created from each vertex u to r with a probability of $\alpha$, and an edge may be created with a probability of 1 for each vertex that may not have any outlinks. The resulting matrix may be further modified so that the vertices of S may have their edges redirected to the absorbing state s with a probability of 1. Consequently, a walk may be absorbed into either the state s or the restart state r. A random walk may begin at a start vertex u. If the start vertex u may have many short paths to S, then it may be more likely to be absorbed into s.

This resulting matrix may be defined to be $F=[f_{u,v}]$, where F may be a row stochastic matrix with $f_{u,v}$ representing a forward walk from node u. Consider $\pi(S,f,hr;u)$ to be the probability that the walk may be absorbed into s and $1-\pi(S,f,hr;u)$ to be the probability that the walk may be absorbed into r. F may incorporate a certain probability $\alpha$ to jump to restate state r and the remaining probability may be evenly distributed over all outgoing edges starting from u defined as follows:

$$f_{u,v} = \begin{cases} \alpha & v = r \\ (1-\alpha)/od_u & \text{otherwise} \end{cases}.$$

The proximity score of a vertex may be related to the proximity score of its out-neighbors by the following harmonic equation:

$$\pi(S, f, hr; u) = \begin{cases} 0 & u = r \\ 1 & u \in S \cup \{s\} \\ \sum_{v \in out(u)} f_{u,v} \cdot p(S, f, hr; v) & \text{otherwise.} \end{cases}$$

Considering a probability distribution p over the vertices in which $p(r)=0$ and $p(s)=1$, the above harmonic equation may be represented as $p \leftarrow Fp$. Observe that this may be a steady-state equation that may be quite different from the steady-state equation for a single step in the random walk $p \leftarrow F^T p$. The solutions to $p \leftarrow F^T p$ may be non-zero in only the states r and s, and the values depend on the start location of the walk. The equation $p \leftarrow Fp$ may not represent a walk and may be expressed as a column-stochastic rather than a row-stochastic matrix.

After the probability distribution may be propagated to other vertices in the graph at step 606, a quality measure of the characterization of the other vertices of the graph may be determined at step 608 using the propagated probability distribution. In the embodiment using the PPR method described in conjunction with the previous step 606, the quality measure may be the proximity score represented by the column vector $\pi(S,f,pr)=(1-\alpha)\cdot R^T \cdot \pi(S,f,pr)+(\alpha/|S|)\cdot \vec{S}$. In the embodiment using the HR method described in conjunction with the previous step 606, the quality measure may be the proximity score of the harmonic equation $$\pi(S, f, hr; u) = \begin{cases} 0 & u = r \\ 1 & u \in S \cup \{s\} \\ \sum_{v \in out(u)} f_{u,v} \cdot p(S, f, hr; v) & \text{otherwise.} \end{cases}$$

The quality measure of the characterization of the other vertices may then be stored at step 610. In an embodiment, the web pages represented by the vertices that may have quality measures within a determined range may be stored in a cluster representing a characterization of those web pages indicated by the range of quality measures.

Figure 7:
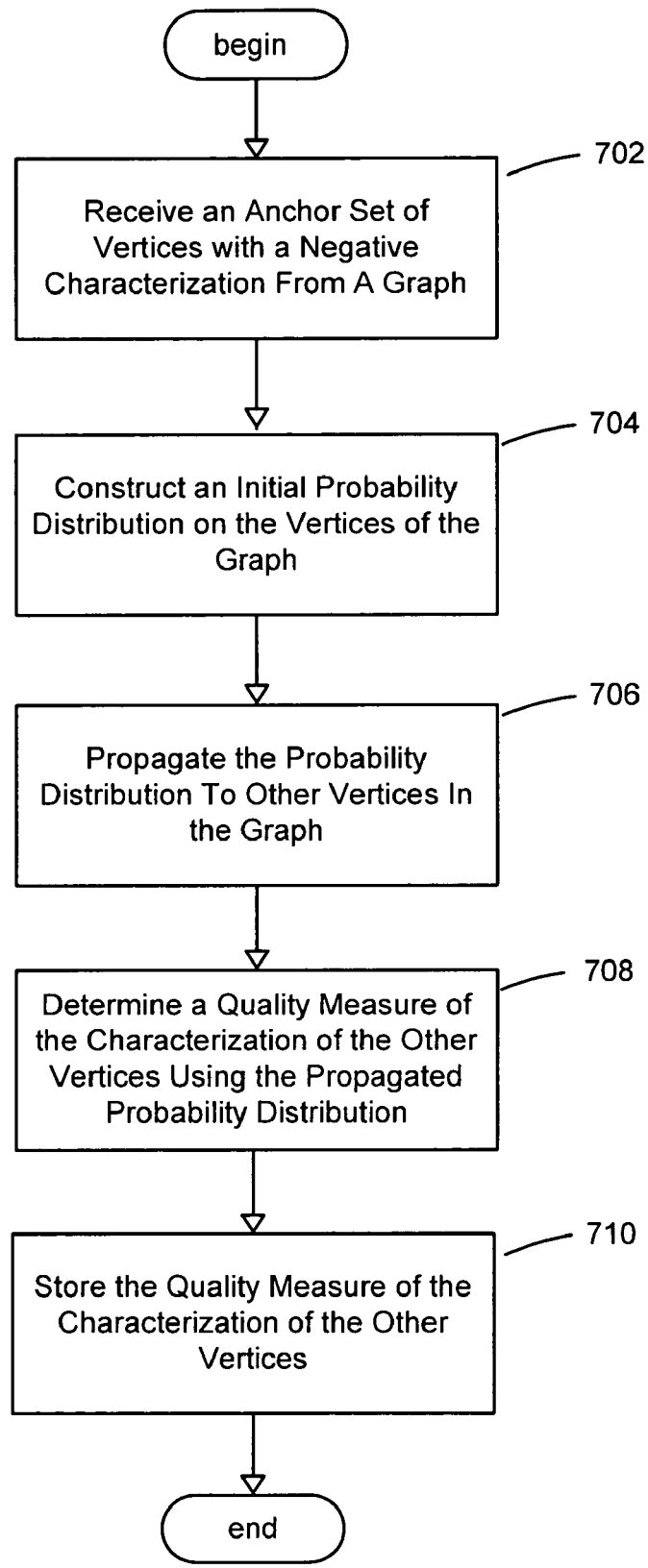
FIG. 7 is a flowchart generally representing the steps undertaken in one embodiment for characterizing a web page using an anchor set with a negative characterization, in accordance with an aspect of the present invention.

FIG. 7 presents a flowchart generally representing the steps undertaken in one embodiment for characterizing a web page using an anchor set with a negative characterization. At step 702, an anchor set of vertices from a graph may be received that may have a negative characterization. An initial probability distribution may be constructed at step 704 on the vertices of the anchor set. The probability distribution may be propagated to other vertices in the graph at step 706. In various embodiments, backward connectivity approaches can be easily realized for propagating probability distributions to other vertices in the graph either by reversing all edges in G or working with the transpose of M and applying the methods described at step 606 of FIG. 6. A quality measure of the characterization of the other vertices of the graph may be determined at step 708 using the propagated probability distribution. Considering for instance that the edges may be reversed in G, in the embodiment using the PPR method described above in conjunction with step 606, the quality measure may be the proximity score represented by the column vector $\pi(S,b,pr)=(1-\alpha)\cdot R^T\cdot\pi(S,b,pr)+(\alpha/|S|)\cdot\vec{S}$. In the embodiment using the HR method described above in conjunction with the step 606, the quality measure may be the proximity score of the harmonic equation $$\pi(S, b, hr; u) = \begin{cases} 0 & u = r \\ 1 & u \in S \cup \{s\} \\ \sum_{v \in out(u)} f_{u,v} \cdot p(S, b, hr; v) & \text{otherwise.} \end{cases}$$

And the quality measure of the characterization of the other vertices may be stored at step 710. In an embodiment, the web pages represented by the vertices that may have quality measures within a determined range may be stored in a cluster representing a characterization of those web pages indicated by the range of quality measures.

Although the methods presented in FIGS. 6 and 7 may preserve flow, these methods may be modified in various embodiments that do not preserve flow. Consider, for example, a matrix T which may capture a particular type of propagation, with update rule $p \leftarrow T^T p$. Even if T may not be stochastic, a propagation rule may be defined so that each vertex i may begin with some initial score $p_i$, and the score may be updated by the rule $\vec{p} \leftarrow \vec{p} + \gamma T^T \vec{p}$, where $\gamma$ may be an attenuation parameter which controls how much a particular score may decay as it propagates. Generally, this propagation may be performed any number of steps, resulting in a final equation for $\vec{p}$ based on an initial vector $\vec{v}$ which may be defined as follows:

$$\vec{p} = \sum_{j=0}^{\infty} \gamma^j (T^T)^j \vec{v} = (I - \gamma T^T)^{-1} \vec{v}.$$

Observe that this equation may be identical to the equation for personalized pagerank with reset distribution given by $\vec{v}$, and reset probability given by $(1-\gamma)$. Whenever a propagation matrix T may be used which may not be row-stochastic, the equation for $\vec{p}$ may be checked to verify that the sum converges. As long as this may be the case, the new measure may be a natural generalization of personalized pagerank. If the sum may not converge, it may be possible to terminate the sum after a fixed number of k iterations defined by the equation $\vec{p}=(I-(\gamma T^T)^{k+1})(I-\gamma T^T)^{-1}\vec{v}$. In general, T may be the matrix M of the original graph, and $\gamma$ may be $\alpha$.

A similar approach may be applied for using the HR method without preserving flow. For example, a unit of flow may enter a vertex u and may then be immediately cut by an $\alpha$ factor. The remaining flow may be copied once to each outedge. Along each edge, a $\gamma$ fraction of the flow may be diverted to state r, and the remainder may pass to the destination, where the propagation may continue. Flow arriving at r or s may remain there without passing any fraction to another destination. If the sum above may converge, then the flow at r and s may approach the total flow in the graph.

Given that there may no longer be a natural probabilistic interpretation of this process, the HR computation may be replaced with two separate computations to track the amount of flow over time arriving at each of the absorbing states, r and S. The overall quality of the start node may then be the total flow over time into s divided by the total flow over time into both r and s. A modification of the given algorithm accordingly suffices to compute each of these new quantities.

Such modified methods for either PPR or HR may have a desirable property in the context of spam resilience. Namely, if a spammer's destination page may be marked as spam, then all pages that may be created by the spammer to direct traffic towards this destination page may also be marked as spam. Even if the spammer may be able to manipulate the graph by adding other links, the score of the in-linking pages may not be demoted by the manipulation.

The modified PPR method that may not preserve flow may be applied in a forward direction from an anchor set with a positive characterization and may be applied in a backward direction from an anchor set with a negative characterization. Thus, there may be four quality measures generated by using the PPR method for propagating a probability distribution from an anchor set: two quality measures using the PPR method preserving flow and two quality measures using PPR method without preserving flow. Likewise, the modified HR method that may not preserve flow may be applied in a forward direction from vertices of the graph to an anchor set with a negative characterization and may be applied in a backward direction from vertices of the graph to an anchor set with a positive characterization. Thus, there may be four quality measures generated by using the HR method for propagating a probability distribution from vertices of the graph: two quality measures using the HR method preserving flow and two quality measures using HR method without preserving flow. The quality measures using an anchor set with a positive characterization may provide a measure of the high quality of a vertex u, while the quality measures using an anchor set with a negative characterization may provide a measure of the low quality of a vertex u.

Those skilled in the art will appreciate that there may be other embodiments for characterizing a web page using two anchor sets of web pages with different characterizations. For instance, consider the case of two anchor sets A,B ⊂ V where A∩B=0. The quality measure for anchor set A using the HR method to propagate a probability distribution in a forward direction from vertices of G to the anchor set A may be denoted as $\pi(A,f,hr)$, and the quality measure for anchor set B using the HR method to propagate a probability distribution in a backward direction from vertices of G to the anchor set B may be denoted as $\pi(B,b,hr)$. In this case, a bidirectional method may be defined that may provide a quality measure for a web page using both anchor sets by walking either in a forward or backward direction.

At the start of the bidirectional method, it may be randomly determined whether to follow a backwards absorbing walk or to follow a forward absorbing walk. If the walk may terminates at A or B, the process may terminate. If the walk instead terminates at S, the process may restart. If the start vertex may have any forward path to a low-quality node or any backward path to a high-quality node, then this method may eventually terminate at either vertices of anchor set A or vertices of anchor set B. The overall quality $q_u$ of a vertex may then be the probability that the bidirectional method may terminate at A. Start nodes u which may link by many short paths to low-quality nodes, but may not have short paths from high-quality nodes linking to those start nodes, may have very low quality scores. Similarly, start nodes that may have many short paths from high-quality nodes linking to those start nodes, but may not link to low-quality nodes even by longer paths, may have quite high quality scores.

For simplicity, consider $a_u=\pi(A,f,hr;u)$ and $b_u=\pi(B,b,hr;u)$. The quality measure for a vertex u, $q_u$, may be defined as $$\frac{\beta a_u}{\beta a_u + (1-\beta)b_u},$$

where $a_u \neq 0$ or $b_u \neq 0$. This may be shown from the following analysis. The first phase of the bidirectional method may walk either forward with a probability of $\beta$ or may walk backward with a probability of $1-\beta$. The probability that the first phase may terminate at anchor set A may be $\beta a_u$, and the probability that it may ends at B may be $(1-\beta)b_u$. The phase may also end at S with the remaining probability, and the process may restart. Consider any sequence of flips of a three-side coin that may have outcomes at A, B and S according to the distribution given above. With probability one, the sequence may include zero or more S values, followed by an A or B value. Thus, for any fixed-length prefix of S values, the probability that the next element may be an A, conditioned on it not being an S, may be $$\frac{a_u}{a_u + b_u}.$$

More generally, given a mechanism for computing for each page u a high-quality score $a_u$ and a low-quality score $b_u$, an overall quality score may be defined as $$q_u = \frac{a_u}{a_u + b_u}.$$

Such a measure may have a desirable scaling property that may be described as follows. Consider a situation in which $a_u$ may be chosen to be the output of an HR method, and for a particular vertex u, perhaps $a_u=\frac{1}{3}$. Additionally, consider $b_u$ to be the result of a PPR process resulting perhaps with $b_u=10^{-9}$ for the same vertex u. It may first appear from the scale of these values that they may not be easily combined into a meaningful quality measure. However, assume that there may be a scaling score $\delta$ such that multiplying the low-quality score by $\delta$ may result in an appropriately rescaled variant which may be used to compute the overall quality score. Consider two pages u and v where u's overall quality may be higher than v's overall quality under the rescaled scores such that $$\frac{a_u}{a_u + \delta b_u} > \frac{a_v}{a_v + \delta b_v}$$

$$\text{Then } \frac{a_u}{a_u + \delta b_u} > \frac{a_v}{a_v + \delta b_v}$$

may be simplified to $a_u b_v > a_v b_u$. Thus, the choice of $\delta$ may not influence the relative quality score of pages, and any of the measures of high-quality web pages may be paired with any of the measures of low-quality web pages to produce an overall page quality measure.

In the previous example, an overall quality measure may be determined using two anchors. In various embodiments, a more general quality measure of web page u may be expressed using a function $G(a_u[1], \ldots, a_u[k])$ where k may be the number of anchors used and $a_u[x]$ may be the quality score of the web page with respect to anchor x. In the previous example G was defined by two anchors, $a_u[1]$ and $a_u[2]$, such that $$G(a_u[1], a_u[2]) = \frac{a_u[1]}{a_u[1] + \delta a_u[2]}.$$

Providing such a characterization of a web page or web site given anchor sets of web pages may be applied broadly by many different applications. Applications that may perform link-based analysis of a graph representing a collection of web pages may use the present invention for the detection of spam web pages, pornagraphic web pages, high-caliber blogs, and other groups of web pages for which a representative set of web pages may be provided. The techniques of the present invention may generally apply for any definitions of anchor sets with a positive or negative characterization. Additionally, a search application may find similar web pages using anchor sets of web pages; a clustering application may find local segments of web pages using anchor set of web pages; a web page classifier may identify web pages that may belong to a class of web pages using anchor sets of web pages, and so forth.

As can be seen from the foregoing detailed description, the present invention provides an improved system and method for characterizing a web page using multiple anchor sets of web pages. A probability distribution may be propagated either in a forward direction or a backward direction between anchor sets of web pages linking to other web pages without a known characterization. Quality measures may be generated from the propagated probability distribution for the web pages without a known characterization in order to characterize these web pages. Advantageously, the present invention may flexibly be applied at the level of individual web pages, or at the level of web hosts, sites, domains, or directories, as desired. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   accessing, by one or more computing devices, a set of web pages within a context, wherein:
      the set of web pages comprises a first subset of web pages with a first known characterization with respect to the context and a second subset of web pages with unknown characterization with respect to the context; and
      the set of web pages are directly or indirectly linked to each other via one or more hyperlinks;
   representing, by the one or more computing devices, the set of web pages using a graph comprising a set of nodes and a set of edges, wherein:
      each node represents a web page; and
      each edge links two nodes and represents a hyperlink that links two corresponding web pages represented by the two nodes;
   generating, by the one or more computing devices, a first probability distribution over the set of nodes of the graph using a first algorithm, wherein the first probability distribution indicates a first measure of closeness, as defined by the first algorithm, among the set of web pages, comprising:
      generating a first initial probability distribution over a first subset of nodes of the graph representing the first subset of web pages; and
      propagating the first initial probability distribution to other nodes of the graph in a direction same as the one or more hyperlinks using the first algorithm;
   generating, by the one or more computing devices, a second probability distribution over the set of nodes of the graph using the first algorithm, wherein the second probability distribution indicates a second measure of closeness, as defined by the first algorithm, among the set of web pages, comprising:
      generating a second initial probability distribution over a second subset of nodes of the graph representing the second subset of web pages; and
      propagating the second initial probability distribution to other nodes of the graph in a direction opposite to the one or more hyperlinks using the first algorithm;
   determining, by the one or more computing devices, a characterization with respect to the context for a web page from the second subset of web pages based on the first probability distribution and the second probability distribution; and
   outputting, by the one or more computing devices, an indication of the characterization of the web page from the second subset of web pages.

2. The method recited in claim 1, wherein the context is spam, pornography, or high-caliber blog.

3. The method recited in claim 1, further comprising:
   generating a third probability distribution over the set of nodes of the graph using a second algorithm, wherein the third probability distribution indicates a third measure of closeness, as defined by the second algorithm, among the set of web pages, comprising:
      propagating the first initial probability distribution to other nodes of the graph in the direction same as the one or more hyperlinks using the second algorithm; and
   determining the characterization with respect to the context for the web page from the second subset of web pages further based on the third probability distribution.

4. The method recited in claim 3, further comprising:
   generating a fourth probability distribution over the set of nodes of the graph using the second algorithm, wherein the second probability distribution indicates a fourth measure of closeness, as defined by the second algorithm, among the set of web pages, comprising:
      propagating the second initial probability distribution to other nodes of the graph in the direction opposite to the one or more hyperlinks using the second algorithm; and
   determining the characterization with respect to the context for the web page from the second subset of web pages further based on the fourth probability distribution.

5. A method comprising:
   accessing, by one or more computing devices, a set of web pages within a context, wherein:
      the set of web pages comprises a first subset of web pages with a first known characterization with respect to the context, a second subset of web pages with a second known characterization with respect to the context, and a third subset of web pages with unknown characterization with respect to the context; and
      the set of web pages are directly or indirectly linked to each other via one or more hyperlinks;
   representing, by the one or more computing devices, the set of web pages using a graph comprising a set of nodes and a set of edges, wherein:
      each node represents a web page; and
      each edge links two nodes and represents a hyperlink that links two corresponding web pages represented by the two nodes;
   generating, by the one or more computing devices, a first probability distribution over the set of nodes of the graph using a first algorithm, wherein the first probability distribution indicates a first measure of closeness, as defined by the first algorithm, among the set of web pages, comprising:
      generating a first initial probability distribution over a second subset of nodes of the graph representing the second subset of web pages; and
      propagating the first initial probability distribution to other nodes of the graph in a direction same as the one or more hyperlinks using the first algorithm; and
   generating, by the one or more computing devices, a second probability distribution over the set of nodes of the graph using the first algorithm, wherein the second probability distribution indicates a second measure of closeness, as defined by the first algorithm, among the set of web pages, comprising:
      generating a second initial probability distribution over a third subset of nodes of the graph representing the third subset of web pages; and
      propagating the second initial probability distribution to other nodes of the graph in a direction opposite to the one or more hyperlinks using the first algorithm; and
   determining, by the one or more computing devices, a characterization with respect to the context for a web page from the third subset of web pages based on the first probability distribution and the second probability distribution; and
   outputting, by the one or more computing devices, an indication of the characterization of the web page from the third subset of web pages.

6. The method recited in claim 5, wherein:
the first known characterization is a positive characterization with respect to the context;
the second known characterization is a negative characterization with respect to the context.

7. A system, comprising:
a memory comprising instructions executable by one or more processors; and
one or more processors coupled to the memory and operable to execute the instructions, the one or more processors being operable when executing the instructions to:
    access a set of web pages within a context, wherein:
        the set of web pages comprises a first subset of web pages with a first known characterization with respect to the context and a second subset of web pages with unknown characterization with respect to the context; and
        the set of web pages are directly or indirectly linked to each other via one or more hyperlinks;
    represent the set of web pages using a graph comprising a set of nodes and a set of edges, wherein:
        each node represents a web page; and
        each edge links two nodes and represents a hyperlink that links two corresponding web pages represented by the two nodes;
    generate a first probability distribution over the set of nodes of the graph using a first algorithm, wherein the first probability distribution indicates a first measure of closeness, as defined by the first algorithm, among the set of web pages, comprising:
        generate a first initial probability distribution over a first subset of nodes of the graph representing the first subset of web pages; and
        propagate the first initial probability distribution to other nodes of the graph in a direction same as the one or more hyperlinks using the first algorithm;
    generate a second probability distribution over the set of nodes of the graph using the first algorithm, wherein the second probability distribution indicates a second measure of closeness, as defined by the first algorithm, among the set of web pages, comprising:
        generate a second initial probability distribution over a second subset of nodes of the graph representing the second subset of web pages; and
        propagate the second initial probability distribution to other nodes of the graph in a direction opposite to the one or more hyperlinks using the first algorithm;
    determine a characterization with respect to the context for a web page from the second subset of web pages based on the first probability distribution and the second probability distribution; and
    output an indication of the characterization of the web page from the second subset of web pages.

8. The system recited in claim 7, wherein the context is spam, pornography, or high-caliber blog.

9. The system recited in claim 7, wherein the one or more processors are further operable when executing the instructions to:
generate a third probability distribution over the set of nodes of the graph using a second algorithm, wherein the third probability distribution indicates a third measure of closeness, as defined by the second algorithm, among the set of web pages, comprising:
    propagate the first initial probability distribution to other nodes of the graph in the direction same as the one or more hyperlinks using the second algorithm; and
    determine the characterization with respect to the context for the web page from the second subset of web pages further based on the third probability distribution.

10. The system recited in claim 9, wherein the one or more processors are further operable when executing the instructions to:
generate a fourth probability distribution over the set of nodes of the graph using the second algorithm, wherein the second probability distribution indicates a fourth measure of closeness, as defined by the second algorithm, among the set of web pages, comprising:
    propagate the second initial probability distribution to other nodes of the graph in the direction opposite to the one or more hyperlinks using the second algorithm and
    determine the characterization with respect to the context for the web page from the second subset of web pages further based on the fourth probability distribution.

11. A system, comprising:
a memory comprising instructions executable by one or more processors; and
one or more processors coupled to the memory and operable to execute the instructions, the one or more processors being operable when executing the instructions to:
    access a set of web pages within a context, wherein:
        the set of web pages comprises a first subset of web pages with a first known characterization with respect to the context, a second subset of web pages with a second known characterization with respect to the context, and a third subset of web pages with unknown characterization with respect to the context; and
        the set of web pages are directly or indirectly linked to each other via one or more hyperlinks;
    represent the set of web pages using a graph comprising a set of nodes and a set of edges, wherein:
        each node represents a web page; and
        each edge links two nodes and represents a hyperlink that links two corresponding web pages represented by the two nodes;
    generate a first probability distribution over the set of nodes of the graph using a first algorithm, wherein the first probability distribution indicates a first measure of closeness, as defined by the first algorithm, among the set of web pages, comprising:
        generate a first initial probability distribution over a second subset of nodes of the graph representing the second subset of web pages; and
        propagate the first initial probability distribution to other nodes of the graph in a direction same as the one or more hyperlinks using the first algorithm; and
    generate a second probability distribution over the set of nodes of the graph using the first algorithm, wherein the second probability distribution indicates a second measure of closeness, as defined by the first algorithm, among the set of web pages, comprising:
        generate a second initial probability distribution over a third subset of nodes of the graph representing the third subset of web pages; and
        propagate the second initial probability distribution to other nodes of the graph in a direction opposite to the one or more hyperlinks using the first algorithm; and
    determine a characterization with respect to the context for a web page from the third subset of web pages based on the first probability distribution and the second probability distribution; and output an indication of the characterization of the web page from the third subset of web pages.

12. The system recited in claim 11, wherein:

the first known characterization is a positive characterization with respect to the context;

the second known characterization is a negative characterization with respect to the context.

13. One or more computer-readable non-transitory storage media embodying software operable when executed by one or more computer systems to:

access a set of web pages within a context, wherein:

the set of web pages comprises a first subset of web pages with a first known characterization with respect to the context and a second subset of web pages with unknown characterization with respect to the context; and the set of web pages are directly or indirectly linked to each other via one or more hyperlinks;

represent the set of web pages using a graph comprising a set of nodes and a set of edges, wherein:

each node represents a web page; and each edge links two nodes and represents a hyperlink that links two corresponding web pages represented by the two nodes;

generate a first probability distribution over the set of nodes of the graph using a first algorithm, wherein the first probability distribution indicates a first measure of closeness, as defined by the first algorithm, among the set of web pages, comprising:

generate a first initial probability distribution over a first subset of nodes of the graph representing the first subset of web pages; and propagate the first initial probability distribution to other nodes of the graph in a direction same as the one or more hyperlinks using the first algorithm;

generate a second probability distribution over the set of nodes of the graph using the first algorithm, wherein the second probability distribution indicates a second measure of closeness, as defined by the first algorithm, among the set of web pages, comprising:

generate a second initial probability distribution over a second subset of nodes of the graph representing the second subset of web pages; and propagate the second initial probability distribution to other nodes of the graph in a direction opposite to the one or more hyperlinks using the first algorithm;

determine a characterization with respect to the context for a web page from the second subset of web pages based on the first probability distribution and the second probability distribution; and output an indication of the characterization of the web page from the second subset of web pages.

14. The media recited in claim 13, wherein the context is spam, pornography, or high-caliber blog.

15. The media recited in claim 13, wherein the software is further operable when executed by the one or more computer systems to:

generate a third probability distribution over the set of nodes of the graph using a second algorithm, wherein the third probability distribution indicates a third measure of closeness, as defined by the second algorithm, among the set of web pages, comprising:

propagate the first initial probability distribution to other nodes of the graph in the direction same as the one or more hyperlinks using the second algorithm; and determine the characterization with respect to the context for the web page from the second subset of web pages further based on the third probability distribution.

16. The media recited in claim 15, wherein the software is further operable when executed by the one or more computer systems to:

generate a fourth probability distribution over the set of nodes of the graph using the second algorithm, wherein the second probability distribution indicates a fourth measure of closeness, as defined by the second algorithm, among the set of web pages, comprising:

propagate the second initial probability distribution to other nodes of the graph in the direction opposite to the one or more hyperlinks using the second algorithm; and determine the characterization with respect to the context for the web page from the second subset of web pages further based on the fourth probability distribution.

17. One or more computer-readable non-transitory storage media embodying software operable when executed by one or more computer systems to:

access a set of web pages within a context, wherein:

the set of web pages comprises a first subset of web pages with a first known characterization with respect to the context, a second subset of web pages with a second known characterization with respect to the context, and a third subset of web pages with unknown characterization with respect to the context; and the set of web pages are directly or indirectly linked to each other via one or more hyperlinks;

represent the set of web pages using a graph comprising a set of nodes and a set of edges, wherein:

each node represents a web page; and each edge links two nodes and represents a hyperlink that links two corresponding web pages represented by the two nodes;

generate a first probability distribution over the set of nodes of the graph using a first algorithm, wherein the first probability distribution indicates a first measure of closeness, as defined by the first algorithm, among the set of web pages, comprising:

generate a first initial probability distribution over a second subset of nodes of the graph representing the second subset of web pages; and propagate the first initial probability distribution to other nodes of the graph in a direction same as the one or more hyperlinks using the first algorithm and generate a second probability distribution over the set of nodes of the graph using the first algorithm, wherein the second probability distribution indicates a second measure of closeness, as defined by the first algorithm, among the set of web pages, comprising:

generate a second initial probability distribution over a third subset of nodes of the graph representing the third subset of web pages; and propagate the second initial probability distribution to other nodes of the graph in a direction opposite to the one or more hyperlinks using the first algorithm; and determine a characterization with respect to the context for a web page from the third subset of web pages based on the first probability distribution and the second probability distribution; and output an indication of the characterization of the web page from the third subset of web pages.

18. The media recited in claim 17, wherein:

the first known characterization is a positive characterization with respect to the context;

the second known characterization is a negative characterization with respect to the context.

* * * * *